United States Patent Office 2,950,983
Patented Aug. 30, 1960

2,950,983

CLAY PRODUCTS AND METHOD OF REDUCING CLAY VISCOSITY

Ben W. Rowland, Hillside, N.J., assignor to Georgia Kaolin Company, Elizabeth, N.J., a corporation of New Jersey No Drawing. Filed Dec. 26, 1957, Ser. No. 705,105

8 Claims. (Cl. 106—288)

This invention relates to a new clay product and a method of reducing the viscosity of clay. A large amount of the Georgia secondary clay reserves suitable from the standpoint of color and purity for coating paper, and for other purposes for which clay is used is of a viscosity too high to be satisfactorily used. For example, the coating of paper is seriously affected by the viscosity of the clay being used. If a clay used in a paper coating has too much "body" or viscosity it will not flow readily in the coating operation and will hinder the penetration of the starch into the base paper to such an extent that the coating is not sufficiently well anchored to the sheet to withstand the pull of tacky inks in printing. Moreover, the printing quality and ink absorption may be unsatisfactory because of the formation of a relatively impervious barrier to the penetration and acceptance of oil-ink vehicles. There are many clays which are suitable from the standpoint of whiteness and apparent purity but they are of such nature that they cannot be satisfactorily refined by the methods now used for the preparation of coating clays. The present method of refinement consists largely in degritting or bleaching and fractionation on the basis of particle size by gravity. These practices have not served to overcome the inherent viscosity difficulties in many clay deposits nor have they served to develop the best qualities or yields of clay which might be obtained from various deposits. The variation to be found in crude clays is great. Crude clays may have aqueous slip viscosities varying from 200 to 12,000 or more centipoises at 10 r.p.m. and 65 to 71% solids according to the Brookfield viscosimeter. Generally speaking, a clay with the viscosity of more than 400 centipoises at 10 r.p.m. in a suspension of 71% solids is unsatisfactory for the roll coating of papers. The present conventional practices, however, afford no means whereby a low viscosity clay may be obtained from deposits which are of high viscosity in the crude state. Such crudes, however, when treated according to the process of this invention, will produce low viscosity clays satisfactory for paper coating and other similar processes.

I have discovered a method of reducing the viscosity of crude clay such as may be found, for example, in the Georgia Fall line deposits. In the practice of my invention I preferably follow the steps of forming an aqueous dispersion of the clay, separating the water from the clay, heat drying the resulting filter cake and thereafter repeating the steps of forming an aqueous dispersion of the resulting dried filter cake, separating the water from the clay and heat drying the filter cake until the desired low viscosity is obtained. I have found that by successively repeating these steps of dispersing, separating water from clay and heat drying I can reduce the viscosity to progressively lower levels. Preferably, I separate the water from the clay by the steps of flocculating the clay, and filtering the resulting flocculated mass from the water. I have found, however, that similar satisfactory results can be obtained by heat drying the dispersed slip as such without flocculating or filtering as for example by pan drying or spray drying. Preferably, the clay is dispersed in aqueous solution by the use of a polyphosphate however, other dispersing agents, such as sodium silicate, may be used.

The invention can perhaps be best understood by reference to the following examples. I have found that a Georgia clay having a viscosity of 5,000 centipoises at 10 r.p.m. on the Brookfield viscosimeter at 71% solids after the usual commercial treatment will have a viscosity of 1560 centipoises at the end of the second series of steps of dispersion, flocculating, filtering and drying. At the end of the third such series of steps it will have a viscosity reduced to 920 centipoises. At the end of the fourth such series or cycle it will have a viscosity of 600; at the end of the fifth cycle—400; at the end of the sixth cycle—220. I have found that the filtering step in each such cycle does not remove any appreciable amount of clay so that there does not appear to be any fractionation. I have also found that the series of steps of forming an aqueous dispersion, separating the water from the clay, either by filtration, drying or some equivalent step and terminated by heat drying must be repeated in each cycle in order to accomplish the results. For example, if in the first cycle the drying step is omitted then there will be essentially no reduction in the viscosity in the second cycle. Likewise when I omit the redispersing step on the second cycle and merely get redrying by moistening the dried cake from the first cycle with water and then redrying, I get no results from this partial second cycle. My experience has shown that for clays treated by the usual commercial methods of dispersing, degritting, floccing, having a viscosity of 2,000 centipoises at 10 r.p.m. Brookfield with a concentration of 71%, a two-cycle processing is usually sufficient to reduce the viscosity to a satisfactory level. With original viscosities in excess of 2,000 centipoises multiple cycling will serve to reduce the viscosity.

An example of the process of my invention is as follows:

A sample of secondary Georgia kaolin clay from the Georgia Fall line was blunged in water with 0.5% by weight of sodium hexametaphosphate. The grit and coarse clay down a particle size suitable for coating clay was removed by sedimentation. The remaining dispersion of clay in water was flocculated with aluminum chloride, filtered and oven dried for several hours at 105° C. The viscosity upon redispersing in water at 71% solids with sodium hexametaphosphate was 1200 centipoises at 10 r.p.m. on the Brookfield viscosimeter. This dried filter cake was then recycled by diluting with water and dispersing agent, flocculating with aluminum chloride, filtering and drying as before. The resulting clay at the end of the second cycle had a viscosity of 380 centipoises at 10 r.p.m. on the Brookfield at 71% solid as compared with the 1200 centipoises at the end of the first cycle.

In another case the same steps were carried out on a Georgia secondary clay and at the end of the first cycle the clay had a viscosity of 1600 centipoises and at the end of the second cycle a viscosity of 500 centipoises.

In a third case a Georgia secondary clay at the end of the first cycle had a viscosity of 1280 centipoises and at the end of the second cycle—380 centipoises.

An English clay, previously degritted, flocced and filtered had a Brookfield viscosity at 66% solids and 10 r.p.m. of 1600 centipoises. After being dispersed with sodium hexametaphosphate, flocced, filtered and dried the viscosity was reduced to 640 centipoises. Repeating the cycle reduced the viscosity to 420 centipoises.

It is thus seen that by following the steps of my process it is possible to take a clay, which at the end of a normal treatment given to it in the clay industry would be unsatisfactory for paper coating and to convert that clay by recycling it into a clay which is satisfactory for paper coating. It is thus possible to take bodies of clay which have heretofore been discarded as unsatisfactory and by processing them according to my invention, produce a clay which is satisfactory for paper coating.

I have found that the process of this invention reduces both the low and high shear viscosities. This is particularly important in modern high speed paper coating methods.

Tests have shown that heat drying is a necessary step in each cycle. Temperatures from 90° C. to 130° C. have been used successfully and there seems to be no critical limit so long as the clay is not heated to a temperature high enough to cause calcining, fusion or the like and is heated sufficiently high to produce drying.

As I have pointed out above there does not seem to be any fractionation in my process because there is little or no loss of clay at the end of the filtering step during each cycle. However, there is a marked change in the viscosity characteristics and there does seem to be a reduction in the amount of calcium present in the clay. The reason for this is not fully apparent and I do not have what I consider to be a comprehensive theory to completely explain the mechanism. I do know that repeated runs according to my process have shown that there is a very important reduction in viscosity by the recycling process of this invention without any significant loss in clay.

While I have described a preferred practice of my invention it will be understood that it may be otherwise practiced within the scope of the following claims.

I claim:

1. The method of reducing the viscosity of crude clay comprising the steps of forming an aqueous dispersion of the clay, separating the water from the clay including heat drying the clay at a temperature above about 90° C. but below the temperature of calcining, reforming an aqueous dispersion of the dewatered clay and repeating the steps of removing the water from the clay including heat drying the clay at a temperature above about 90° C. but below the temperature of calcining and reforming an aqueous dispersion until a desired low viscosity is obtained in the resulting clay.

2. The method of reducing the viscosity of crude clay comprising the steps of forming an aqueous dispersion of the clay with a polyphosphate dispersing agent, separating the water from the clay at a temperature between about 90° C. and 130° C. including heat drying the clay, reforming an aqueous dispersion of the dewatered clay with a polyphosphate and repeating the steps of removing the water from the clay including heat drying the clay at a temperature between about 90° C. and 130° C. and thereafter reforming an aqueous dispersion until the desired low viscosity is obtained in the resulting clay.

3. The method of reducing the viscosity of crude clay comprising the steps of forming an aqueous dispersion of the clay with a silicate dispersing agent, separating the water from the clay at a temperature between about 90° C. and 130° C. including heat drying the clay, reforming an aqueous dispersion of the dewatered clay with a silicate dispersing agent and repeating the steps of removing the water from the clay including heat drying the clay at a temperature between about 90° C. and 130° C. and thereafter reforming an aqueous dispersion until the desired low viscosity is obtained in the resulting clay.

4. The method of reducing the viscosity of crude clay comprising the steps of forming an aqueous dispersion of the clay, removing the grit and coarse clay particles by sedimentation, separating the water from the resulting aqueous dispersion including heat drying the clay at a temperature above about 90° C. but below the temperature of calcining, reforming the dewatered clay into an aqueous dispersion and repeating the steps of separating the water from the aqueous dispersion including heat drying the clay at a temperature above about 90° C. but below the temperature of calcining reforming an aqueous dispersion of the clay until the desired low viscosity has been obtained in the clay.

5. The method of reducing the viscosity of crude clay comprising the steps of forming an aqueous dispersion of clay, removing the grit and coarse clay particles by sedimentation, separating the water from the resulting aqueous dispersion by spray drying at a temperature between about 90° C. and 130° C., reforming the dewatered clay into an aqueous dispersion and repeating the steps of dewatering the clay by spray drying at a temperature between about 90° C. and 130° C. and reforming the dewatering clay into an aqueous dispersion until the desired low viscosity has been obtained.

6. The method of reducing the viscosity of crude clay comprising the steps of forming an aqueous dispersion clay, removing the grit and coarse clay particles by sedimentation, separating the water from the resulting aqueous dispersion by flocculating followed by filtration and heat drying of the flocculated clay at a temperature between about 90° C. and 130° C., reforming the dewatered clay into the aqueous dispersion and repeating the steps of dewatering the clay by flocculating followed by filtration and heat drying of the flocculated clay at a temperature between about 90° C. and 130° C., and reforming the dewatering clay into an aqueous dispersion until the desired low viscosity has been obtained.

7. The method of reducing the viscosity of paper-coating clay comprising the steps of forming an aqueous dispersion of clay with a polyphosphate dispersing agent, removing the grit and coarse clay by sedimentation, flocculating the resulting aqueous dispersion, separating the flocculated clay from the water and unflocculated material, heat drying the separated clay at a temperature between about 90° C. and 130° C., redispersing the dried clay with a polyphosphate dispersing agent, and repeating the steps of flocculating the clay, separating the flocculated clay from the water and heat drying the separated clay at a temperature between about 90° C. and 130° C. until the desired low viscosity has been obtained in the clay.

8. A clay product characterized by a viscosity substantially lower than that of a crude clay from which it is made and resulting from repeating, at least twice, the steps of forming an aqueous suspension of the clay in a suitable dispersing agent, and separating the water from the clay including heat drying at a temperature between about 90° C. and 130° C.

References Cited in the file of this patent

UNITED STATES PATENTS

| | | |
|---|---|---|
| 1,561,971 | Coffin et al. | Nov. 17, 1925 |
| 2,255,371 | Williams | Sept. 9, 1941 |
| 2,337,597 | Hall | Dec. 28, 1943 |
| 2,440,601 | Dickerman | Apr. 27, 1948 |
| 2,535,647 | Millman et al. | Dec. 26, 1950 |
| 2,569,680 | Leek | Oct. 2, 1951 |
| 2,677,619 | Eirich et al. | May 4, 1954 |
| 2,815,292 | Thiele | Dec. 3, 1957 |